(12) United States Patent
Redpath

(10) Patent No.: US 6,347,316 B1
(45) Date of Patent: Feb. 12, 2002

(54) NATIONAL LANGUAGE PROXY FILE SAVE AND INCREMENTAL CACHE TRANSLATION OPTION FOR WORLD WIDE WEB DOCUMENTS

(75) Inventor: Richard J. Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,525

(22) Filed: Dec. 14, 1998

(51) Int. Cl.⁷ .......................... G06F 17/30; G06F 17/28
(52) U.S. Cl. .............................. 707/10; 707/203; 704/2; 704/8
(58) Field of Search ................................. 707/1–206, 4, 707/10, 101, 104.1, 200–204; 704/1–10; 709/201–203, 217–219, 246

(56) References Cited

U.S. PATENT DOCUMENTS

| | | | | |
|---|---|---|---|---|
| 5,140,522 A | * | 8/1992 | Ito et al. ........................ | 704/2 |
| 5,828,990 A | * | 10/1998 | Nishino et al. ................ | 704/2 |
| 5,944,790 A | * | 8/1999 | Levy ........................... | 709/218 |
| 5,974,371 A | * | 10/1999 | Hirai et al. .................... | 704/2 |
| 6,119,078 A | * | 12/2000 | Kobayakawa et al. ......... | 704/3 |
| 6,161,082 A | * | 12/2000 | Goldberg et al. .............. | 704/3 |
| 6,163,785 A | * | 12/2000 | Carbonell et al. ........... | 707/530 |

* cited by examiner

Primary Examiner—Maria N. Von Buhr
(74) Attorney, Agent, or Firm—Gregory M. Doudnikoff

(57) ABSTRACT

A technique for use in a client-server environment, such as the World Wide Web, for providing a client with the best available translated version of a document requested from a server in a language other than the original language of the document. In response to a request from a client for a document in a secondary language, the technique determines if a version of the document exists in the specified secondary language. The invention supports more than one type of translated version; namely, a machine translation version and a human translation version. Typically, human translation versions are more accurate than machine translation versions. If both translation versions are available and the most recent version is newer than the original document, or if one of the translation versions is available and that version is newer than the original document, the most recent version is sent to the client. If no translation version is available or the available versions are older than the original document, a machine translation version of the original document in the requested language is created and sent to the client.

10 Claims, 6 Drawing Sheets

FIG. 6

| 'PERFECT' FILE | 'GENERATED' FILE | NEWEST FILE | FILE RETURNED |
|---|---|---|---|
| NO | NO | ORIGIN | Newly Generated File |
| NO | YES | ORIGIN | Newly Generated File |
| | | GENERATED | Generated File |
| YES | NO | ORIGIN | Newly Generated File |
| | | PERFECT | Perfect File |
| YES | YES | ORIGIN | Newly Generated File |
| | | PERFECT | Perfect File |
| | | GENERATED | Generated File |

NATIONAL LANGUAGE PROXY FILE SAVE AND INCREMENTAL CACHE TRANSLATION OPTION FOR WORLD WIDE WEB DOCUMENTS

BACKGROUND OF THE INVENTION

1. Field of the Invention

The present invention relates to a technique for enabling improved document translation for documents available for downloading via the Internet or World Wide Web (WWW). More particularly, the present invention provides a method, computer readable code and system for providing an improved machine translation process for documents on the WWW which permit superior translations to be produced.

2. Description of the Related Art

One problem that is slowing the expansion and acceptance of the World Wide Web (WWW) and it actually becoming "world wide" is the problem of language. Generally, companies, individuals, governments or organizations that make documents available via the WWW make them available in a single language.

A number of language translation service companies, such as Transparent Language Inc. and Globalink Corporation, now provide Web translation software for Web users' personal Web browsers. Transparent Language Corporation provides a tool called Easy Translator which uses dynamic data exchange (DDE) to communicate with the browser. The Globalink solution provides an add-on software component for a Web browser.

Search engines also now provide translation support for documents retrieved in a search. For example, the AltaVista search engine utilizes technology from Systran Software, Inc. to provide users with the option to provide translated versions of retrieved documents. AltaVista is a trademark of Compaq Computer Corporation. Additionally, AltaVista provides a website at http://babelfish.altavista.com/cgi-bin/translate? at which a user may enter an address for a document on the WWW, indicate the original language of the document and a desired language into which the user wants to translate the document. The translation is done remotely at the server, so the user does not need to have any translation software loaded on his or her computer.

The computer-based automated translation technique utilized by the software and systems described above is known as "machine translation." A background description of machine translation can be found at http://www.systransoft.com/FAQs.html. Machine translation software translates one natural language into another natural language. Machine translation takes into account the grammatical structure of each language and uses rules to transfer the grammatical structure of the source language into the target language.

However, given the complexities involved in languages, machine translation tends to be only about 30% to maybe 65% accurate. Many phrases and colloquial terms do not translate easily. Attempts to translate the names of towns, cities, places, etc. are made when they shouldn't be translated. Rules which are hard-coded for certain grammatical features may always be applied, even though many exceptions to the rules exist, since writing code for all the exceptions would be a prolonged task, and make the translation process quite slow. So a document translated by current machine translation techniques may or may not even be understandable to a user; worse yet, some important elements of the document may be translated incorrectly.

Machine translation cannot replace a human translator, nor is it intended to. Therefore, many of the companies that provide machine translation software also provide old-fashion human translation services to provide documents that are translated with a high degree of accuracy.

The accuracy problem with machine translation can be explained by a simple example. Using presently available machine translation, if a user was to translate a sentence from English to French, a certain degree of inaccuracy would be involved. In translating the sentence back to English using machine translation, the original translation inaccuracy is amplified, and the sentence will in most instances be different than the original English sentence.

Accordingly, a need exists for a technique which provides accurately translated WWW documents which are available for downloading.

SUMMARY OF THE INVENTION

Accordingly, an object of the present invention is to provide translated WWW documents having a high degree of accuracy.

Yet another object of the present invention is to provide technique for combining machine translation with incrementally-enabled human translation.

Another object of the invention is to enhance server performance and minimize network utilization by providing a caching technique for translated WWW documents.

Still another object of the invention is to permit the owner of the document to control the translation and to prevent translations of old versions of a document to be sent to a document requester at a client.

These and other features, aspects, and advantages of the present invention will become better understood with reference to the following description, appended claims, and accompanying drawings, in which like numbers refer to like elements throughout.

Other objects and advantages of the present invention will be set forth in part in the description and the drawings which follow, and, in part, will be obvious from the description or may be learned by practice of the invention.

To achieve the forgoing objects, and in accordance with the purpose of the invention as broadly described herein, the present invention provides computer readable code stored on media for use with a server linked to a network and which provides documents to requesters at clients, the code responding to client requests to provide a document in a language other than an original language of the document, the code comprising first subprocesses, responsive to a request from a client for a document in a language other than an original language of the document, for determining if at least one translated version of the document is available for transmitting to the client; second subprocesses for, if the first subprocesses determines that at least one translated version is available, determining which of the translated versions is newest and whether the newest translated version is newer than the document, and if so, transmitting the newest translated version to the client; and third subprocesses for causing a machine translation version of the document to be created if the first subprocesses determines that no translated version is available or if the second subprocesses determines that the newest translated version is not newer than the document, and transmitting the machine translation to the client. The first subprocesses further determines if a machine translation version of the document or a perfected translation version of the document is available. The third subprocesses further causes the created machine translation version to be named in accordance with a naming convention and stored.

The present invention also provides, in a client-server environment, a system for providing a translated document to a client which requests a document from a server in a language other than its original language, comprising means for determining that a document has been requested by a client from a server in a language other than its original language; means for determining if a machine translation version of the document is available; means for determining if an edited translated version of the document is available; means for determining which of the machine translation version and the edited translation version is most recent and whether the most recent version is newer than the document; means for transmitting the newest version to the client if the most recent version is newer than the document; and means for creating a new machine translation version of the document and sending it to the client if the most recent version is not newer than the document or if no machine translation version and no edited translation version is found to be available. The system may further comprise means for creating, in response to the request for the document in a language other than its original language, filenames of the document that would correspond to the machine translation version of the document and the edited translation version of the document in the requested language, wherein the means for determining whether the machine translation version is available and the means for determining whether the edited translation version is available determine whether copies of the created filenames are available. Further, the system may comprise means for naming the newly created machine translation version of the document with a filename that corresponds to a predetermined naming convention that identifies the language of the newly created machine translation version and that the newly created machine translation version is a machine translation version of the document, and saving the newly created machine translation document for future use. Also, the means for determining which of the machine translation version and the edited translation version is most recent and whether the most recent version is newer than the document does so by checking a timestamp associated each version and the document.

The present invention also provides a method in a client-server environment for delivering a document written in a first language from a server to a client in a requested second language, the method comprising the steps of (a) in response to a request from a client for a document written in a first language to be sent in a second language, determining if a second language version of the document is available for sending; (b) if more than one second language version of the document is found to be available, determining which of the versions has a most recent timestamp and selecting the most recent version; (c) if only one second language version was found in step (a) or for the selected second language version, determining whether the second language version has a timestamp which is more recent than a timestamp for the document; (d) if the second language version is found A technique for use in a client-server environment, such as the World Wide Web, for to have a more recent timestamp in step (c), sending the second language version to the client; and (e) if no second language version was found in step (a) or if the timestamp for the document is more recent than the timestamp of the second language version, creating a machine translation version of the document and sending the machine translation version to the client.

Step (d) may further comprise saving the machine language version for consideration with respect to future client requests for the document in the second language, and step (a) may further comprise determining whether a machine translation version of the document is available in the second language and whether a perfected version of the document is available in the second language, and wherein if both are available, step (b) further comprises determining which has the most recent timestamp.

The present invention will now be described with reference to the following drawings, in which like reference numbers denote the same element throughout.

BRIEF DESCRIPTION OF THE DRAWINGS

FIG. 6 is a chart showing the possible outcomes to a request for a translated document in accordance with the present invention.

DESCRIPTION OF THE PREFERRED EMBODIMENT

An embodiment of the present invention will now be described with initial reference to FIG. 1, which illustrates a representative hardware environment in which the present invention may be practiced.

Figure 1:
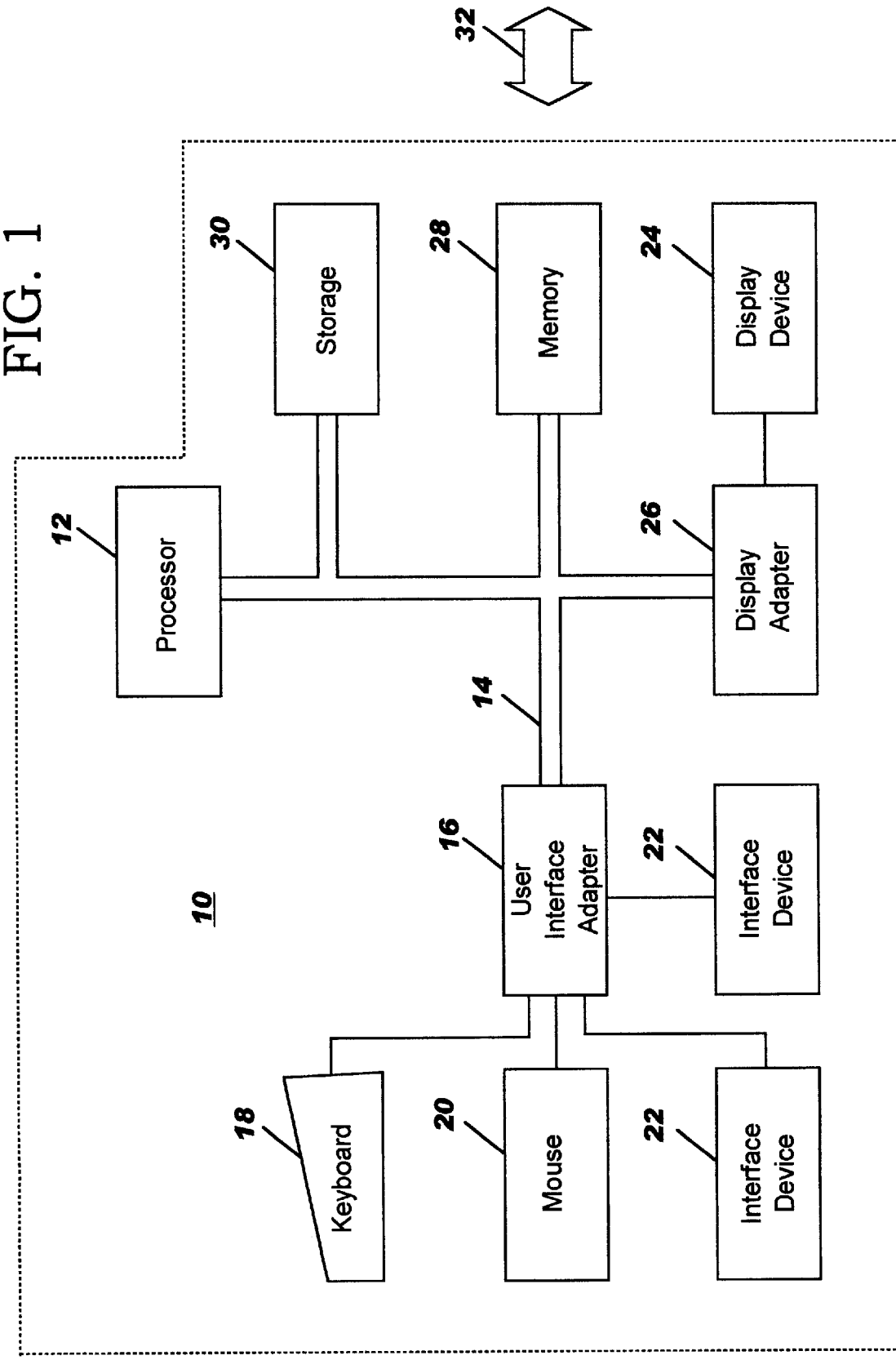
FIG. 1 is a pictorial representation of a data processing system which may be utilized to implement the present invention.

The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
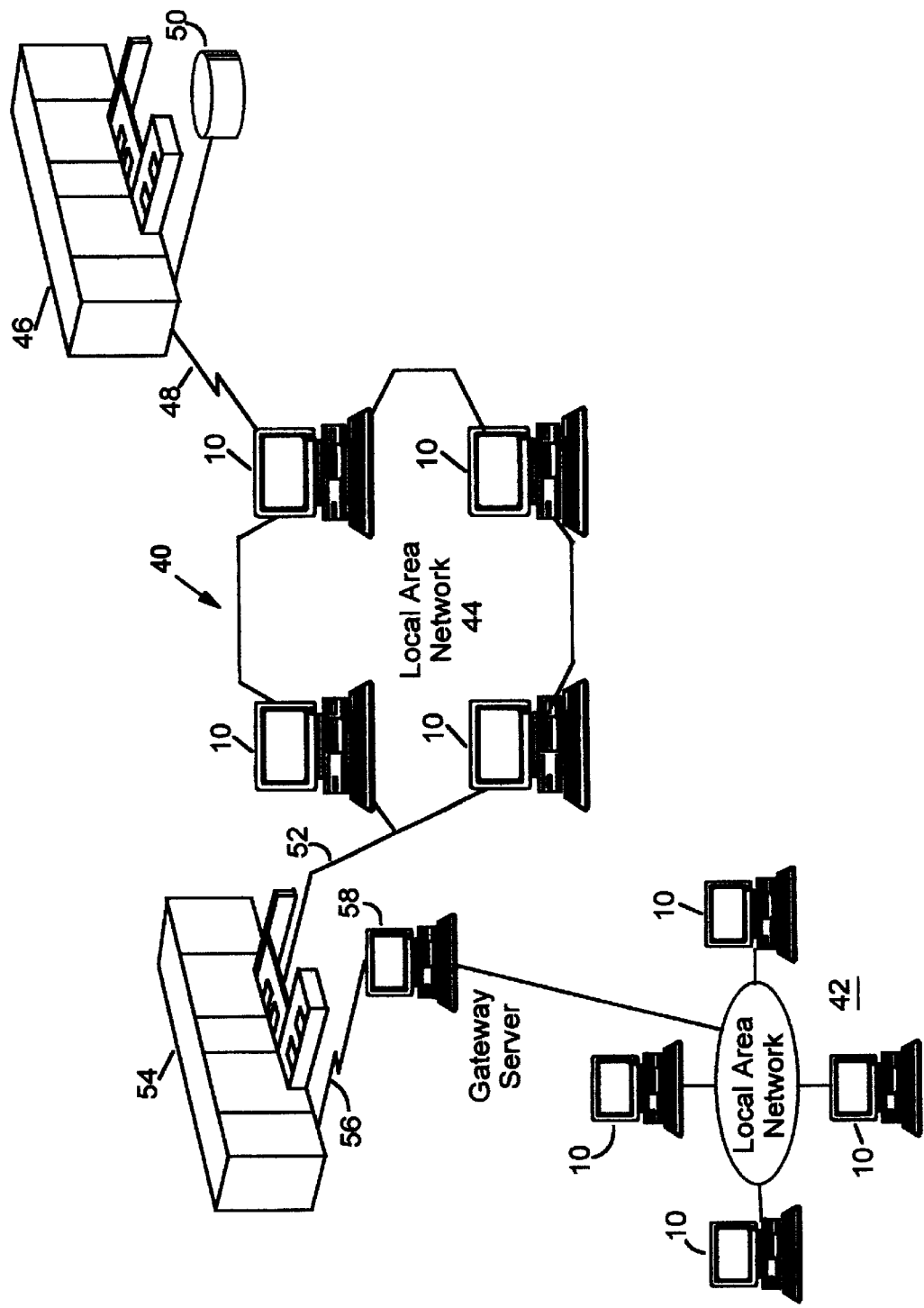
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Figure 3:
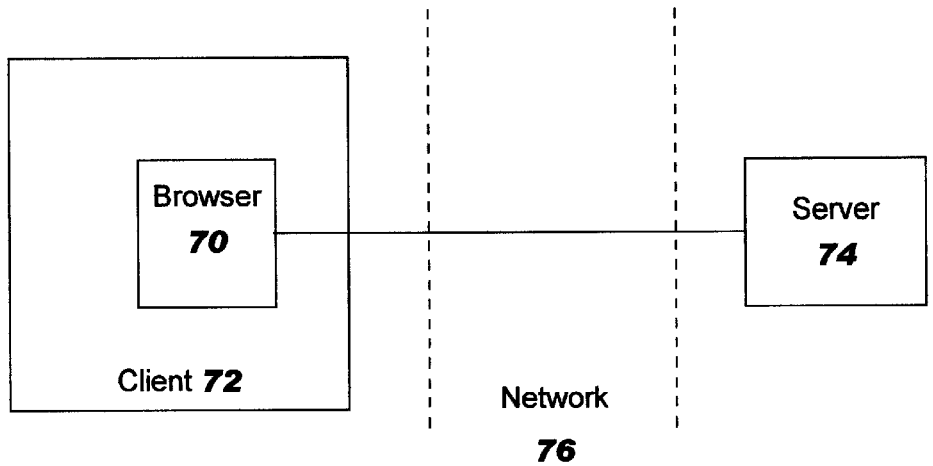
FIG. 3 illustrates a prior art client-server arrangement via which a client may retrieve documents from a server via a network.

Referring to FIG. 3, a known arrangement for a providing a user of the Internet with a document via the World Wide Web (WWW) is illustrated. The WWW comprises many documents or pages or files of information resident on many different server machines, which are distributed throughout the world. Each document is identified by a uniform resource locator (URL). The URL denotes both the document and the server machine on which it resides. There may be one or many documents on a given server. In order to use the WWW, a user at a workstation or the like which functions as a client machine has a Web browser, such as Netscape Navigator from Netscape Communications Corporation, resident thereon. The user enters a URL or selects a URL via a hyperlink into a web browser 70 resident on a client 72, which in turn causes a request to be sent of for the specified document to a web server 74 identified in the URL via a network 76. Typically, the web server 74 responds to the request by retrieving the requested document, and transmitting the data for the requested document back to the requesting client (the client-server interaction is performed in accordance with the hypertext transport protocol (HTTP)). The document is then displayed by the browser 70 to the user at the client machine.

The overall concept of the present invention is to provide an improved technique for providing translated versions of Web pages, documents or sites (hereafter generally referred to as 'documents'). The present invention permits the owner of the Web document or manager of a web site to control the translation, and makes sure that the best translation presently available is provided to the user, and that a translation of a prior version of the document is not forwarded to the user. The preferred embodiment of the present invention will now be discussed with reference to FIGS. 3 through 6.

Figure 4:
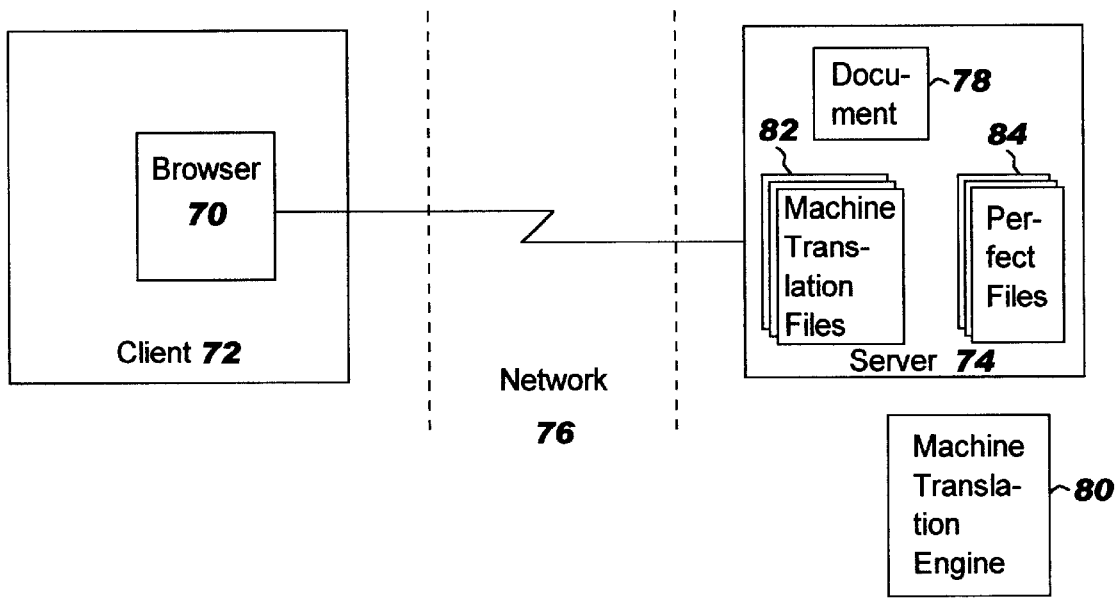
FIG. 4 illustrates a client-server arrangement modified to implement the present invention.

FIG. 4 illustrates the system of FIG. 3 as modified to implement the present invention. A document 78, which is in English and hereafter referred to as the origin document, is maintained or stored at the web server 74. As discussed, computer automated machine translation provides a quick and easy way to translate the origin document to a language desired by a requester of the origin document. Accordingly, a machine translation engine 80 is associated with the web server 74 to create machine translation versions of the origin document 78 in various supported languages, which are saved as machine translation files 82. Computer automated machine translations are not perfect but have great value when there has not been time to create a superior human-translated file or if no financial resources available to create a human-translated file. The machine translation files 82 can also provide a good resource for human translators in creating superior translations, as they can be used as starting points and edited by a translator. Thus, the system according to the present invention permits human intervention to occur, and causes the edited files or entirely new translations, hereafter referred to as perfect files, to also be saved in the server 74 as perfect files 84.

The present invention provides an algorithm for use in a system like that described with respect to FIG. 4 for providing the requester with the best available translation on the server 74 for a requested document, and for making sure that a translation for an earlier or stale version of the origin document is not provided to the requester. The present invention also provides a seamless optimal technique for providing a multilingual web site with partial human translation resources in place to increase the quality of translation.

Figure 5A:
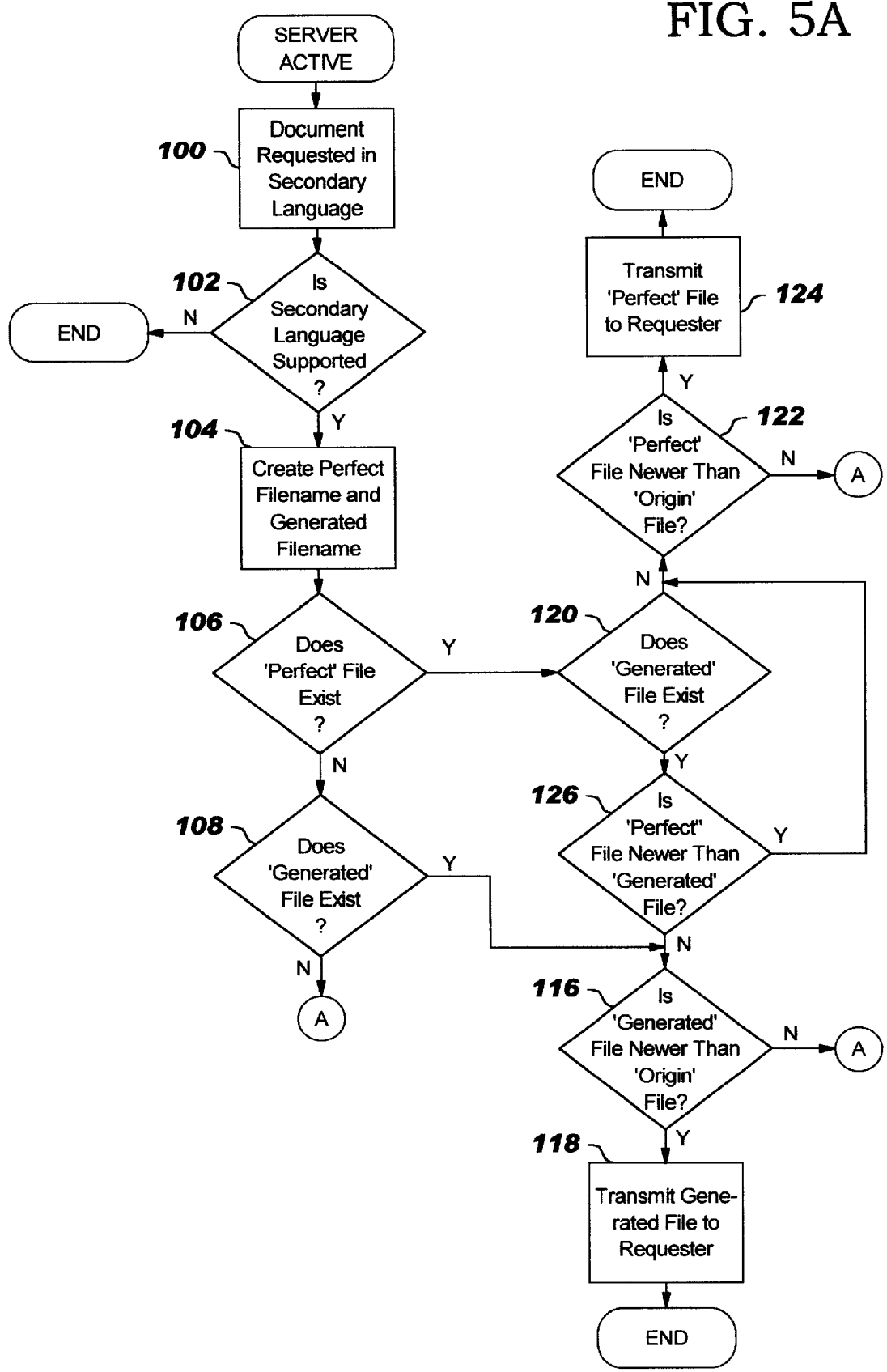
FIGS. 5A and 5B illustrate a flowchart showing the logic associated with a system for providing the best available translated version of a document requested by a client from a server in accordance with the present invention.
Figure 5B:
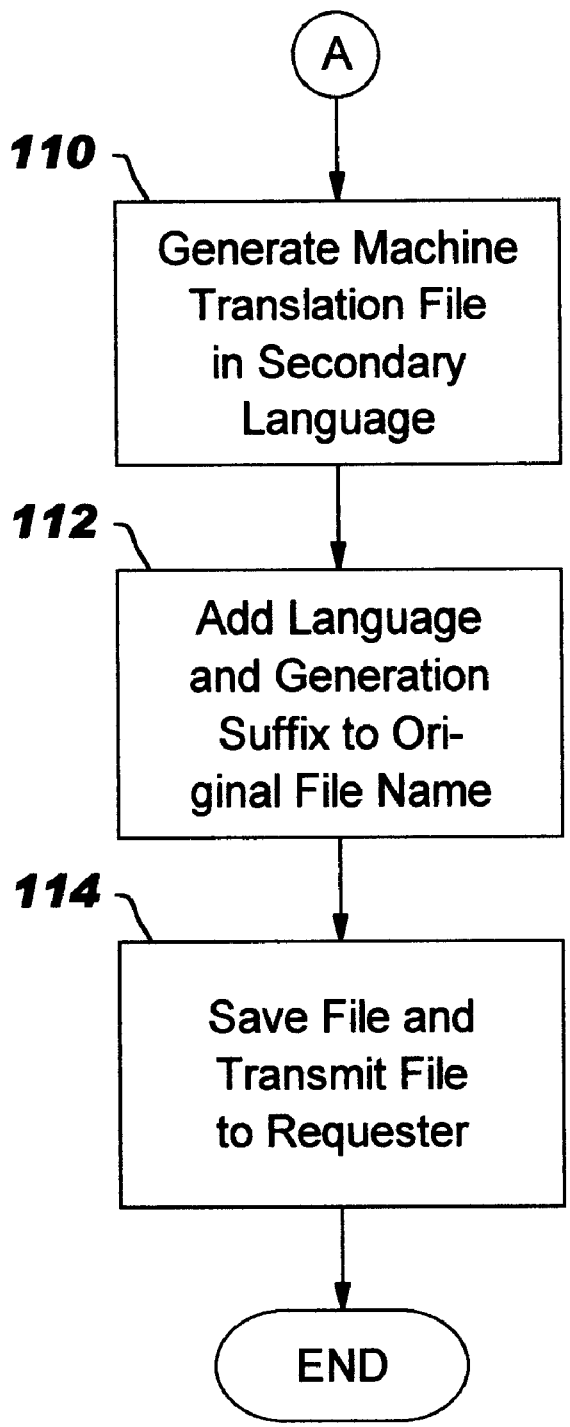

The present invention will now be described with reference to the flow chart of FIG. 5, in which a technique for providing the best available translation of an origin document which is in English when the requested language is German.

As per Step 100, the present invention is invoked when a user or requester requests a document from a server which is not in the original language of the document. As noted, this may be actually done in a variety of ways. The Netscape browser has preferences built in which permit a user to invoke a list of preferred languages in a desired order of preferability. These preferences are reviewed by the server which maintains the requested document. If the requested document is in the requested language, the present invention is not invoked. However, when the preferred language is not the original language of the requested document (hereafter referred to as the origin document or parent document), the invention is invoked. Next, a determination is made as to whether the requested language is supported (Step 102). Not all languages are supported by machine translation, and the owner of the server may not find it necessary to provide the document in all of the languages for which machine translation is available. If no translation is available in the requested language, processing according to the present invention ends. In practice, an error message may be returned to the requester or the document in its language of origin may be returned.

If it is determined that the requested secondary language is supported by the server, the server creates a pair of filenames which are variations on the filename of the requested file in accordance with a predetermined naming convention. The naming convention should take into account the filename syntax supported by the operating system and the requested language. One of the created filenames is the filename that would be used for a machine translation version of the origin document, the other the filename that would be used for a human-translated version of the origin document or a human translator enhanced version of the machine translation version. For example, in a UNIX system, an appropriate suffix or extension may be added. Thus, if a German translation of a document is requested, the filename "documentname.de.gen" is created to represent the machine translation version of the document, and the filename "documentname.de" is created to represent the perfect version of the document (Step 104).

The chart of FIG. 6 illustrates the possible combinations of document existence. Whenever a file is created or modified in virtually all operating systems, a timestamp is associated with the filename. Basically, if a perfect or generated version of a document is found to exist, and that version is newer than the origin file (based on the timestamp, thus indicating that the translated file is a translation of the current origin file and not an earlier version thereof), the newest of the perfect or generated document is returned to the requester. If neither translated version of the origin document is found to exist, or if the translated versions are not newer than the origin version, then a machine translation version of the origin document is created, and this newly created version is returned to the requester.

In accordance with these possibilities, a determination is then made as to whether the perfect file actually exists on the server (Step 106). If no perfect file is found to exist, processing proceeds to Step 108, where it is determined whether the generated file actually exists on the server. If no generated version is found to exist in Step 108, then processing proceeds to Step 110, in which a machine translation version of the requested document is created in accordance with known techniques. The file is named appropriately in accordance with the conventions described above (for a German machine translation of a document named "filename", the name would be "documentname.de.gen" according to the preferred embodiment) (Step 112). The new file is saved by the server and transmitted to the requester (Step 114).

On the other hand, if a generated file is found to exist in Step 108, a determination is then made in Step 116 as to whether the generated file is new than the origin file by comparing their respective timestamps. If the generated file is newer than the origin file, indicating that it is current, then the generated file is transmitted to the requester (Step 118). Otherwise, if the generated document is found to be older than the origin document, processing proceeds to Step 110, and a new machine translation file is created, saved and transmitted to the requester, as per Steps 110 through 114.

If in Step 106, it is determined that a perfect file for the requested document does exist in the requested language, processing proceeds to Step 120, in which a determination is made as to whether a generated file exists. If no generated file exists, processing proceeds to Step 122, in which a determination is made as to whether the perfect file is newer than the origin file. If so, the perfect file is transmitted to the requester (Step 124), and processing relative to the current request ends. However, if the perfect file is found to be older than the origin file, the perfect file is considered to be stale, and processing proceeds to Step 110, and a new machine translation file is generated, saved and transmitted to the requester, as per Steps 110 through 114.

Lastly, for situations in both a perfect file is found to exist in Step 106 and a generated file is found to exist in Step 120, a determination is made to determine which of the two is newer or more recently created or modified (Step 126). If the perfect file is found to be newer, processing jumps to the logic described with respect to Step 122, and if the perfect file is newer than the origin file, it is sent to the requester (Step 124), and if it is older than the origin file, a new machine translation file is created, saved and transmitted (Steps 110 through 114). If the machine translation file is found to be newer than the perfect file in Step 126, processing jumps to the logic described previously with respect to Step 116, and if the machine translation file is newer than the origin file, the machine translation file is sent to the requester (Step 118), and if it is older than the origin file, a new machine translation file is created from the origin file, saved and transmitted to the requester (Steps 110 through 114). Processing then ends relative to the requested file.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. Computer readable code stored on media for use with a server linked to a network and which provides documents to requesters at clients, said code responding to client requests to provide a document in a language other than an original language of the document, said code comprising:

first subprocesses, responsive to a request from a client for a document in a language other than an original language of the document, for determining if at least one translated version of the document is available for transmitting to the client;

second subprocesses for, if said first subprocesses determines that at least one translated version is available, determining which of the translated versions is newest and whether the newest translated version is newer than the document, and if so, transmitting the newest translated version to the client; and third subprocesses for causing a machine translation version of the document to be created if said first subprocesses determines that no translated version is available or if said second subprocesses determines that the newest translated version is not newer than the document, and transmitting the machine translation to the client.

2. The computer readable code of claim 1, wherein said first subprocesses further determines if a machine translation version of the document or a perfected translation version of the document is available.

3. The computer readable code of claim 1, wherein said third subprocesses further causes the created machine translation version to be named in accordance with a naming convention and stored.

4. In a client-server environment, a system for providing a translated document to a client which requests a document from a server in a language other than its original language, comprising:

- means for determining that a document has been requested by a client from a server in a language other than its original language;
- means for determining if a machine translation version of the document is available;
- means for determining if an edited translated version of the document is available;
- means for determining which of the machine translation version and the edited translation version is most recent and whether the most recent version is newer than the document;
- means for transmitting the newest version to the client if the most recent version is newer than the document; and
- means for creating a new machine translation version of the document and sending it to the client if the most recent version is not newer than the document or if no machine translation version and no edited translation version is found to be available.

5. The system of claim 4, further comprising:

- means for creating, in response to the request for the document in a language other than its original language, filenames of the document that would correspond to the machine translation version of the document and the edited translation version of the document in the requested language,
- wherein said means for determining whether the machine translation version is available and the means for determining whether the edited translation version is available determine whether copies of the created filenames are available.

6. The system of claim 4, further comprising:

- means for naming the newly created machine translation version of the document with a filename that corresponds to a predetermined naming convention that identifies the language of the newly created machine translation version and that the newly created machine translation version is a machine translation version of the document, and saving the newly created machine translation document for future use.

7. The system of claim 4, wherein said means for determining which of the machine translation version and the edited translation version is most recent and whether the most recent version is newer than the document does so by checking a timestamp associated each version and the document.

8. A method in a client-server environment for delivering a document written in a first language from a server to a client in a requested second language, said method comprising the steps of:

(a) in response to a request from a client for a document written in a first language to be sent in a second language, determining if a second language version of the document is available for sending;

(b) if more than one second language version of the document is found to be available, determining which of the versions has a most recent timestamp and selecting the most recent version;

(c) if only one second language version was found in said step (a) or for the selected second language version, determining whether the second language version has a timestamp which is more recent than a timestamp for the document;

(d) if the second language version is found to have a more recent timestamp in said step (c), sending the second language version to the client; and (e) if no second language version was found in said step (a) or if the timestamp for the document is more recent than the timestamp of the second language version, creating a machine translation version of the document and sending the machine translation version to the client.

9. The method according to claim 8, wherein said step (d) further comprises saving the machine language version for consideration with respect to future client requests for the document in the second language.

10. The method according to claim 8, wherein said step (a) further comprises determining whether a machine translation version of the document is available in the second language and whether a perfected version of the document is available in the second language, and wherein if both are available, said step (b) further comprises determining which has the most recent timestamp.

* * * * *